United States Patent

Sheafor et al.

[11] Patent Number: 6,119,188
[45] Date of Patent: Sep. 12, 2000

[54] PRIORITY ALLOCATION IN A BUS INTERCONNECTED DISCRETE AND/OR INTEGRATED DIGITAL MULTI-MODULE SYSTEM

[75] Inventors: Stephen James Sheafor, Boulder; James Yuan Wei, Longmont; Bradford Clark Lincoln, Boulder, all of Colo.

[73] Assignee: Fusion MicroMedia Corp., Longmont, Colo.

[21] Appl. No.: 09/067,584

[22] Filed: Apr. 27, 1998

Related U.S. Application Data

[63] Continuation-in-part of application No. 08/863,875, May 27, 1997, Pat. No. 5,983,303, and a continuation-in-part of application No. 08/942,011, Oct. 1, 1997.

[51] Int. Cl.[7] .................................................. G06F 13/14
[52] U.S. Cl. .......................................... 710/107; 710/240
[58] Field of Search .................................... 710/107, 110, 710/111, 112–116, 119, 121–122, 240–244

[56] References Cited

U.S. PATENT DOCUMENTS

| | | | |
|---|---|---|---|
| 4,814,974 | 3/1989 | Narayanan et al. ..................... | 364/200 |
| 5,621,897 | 4/1997 | Boury et al. ............................. | 395/296 |
| 5,634,060 | 5/1997 | Jennings ................................... | 395/729 |
| 5,640,519 | 6/1997 | Langendorf et al. ................... | 395/291 |
| 5,758,105 | 5/1998 | Kelley et al. ........................... | 395/293 |
| 5,862,355 | 1/1999 | Logsdon ................................... | 395/296 |
| 5,901,146 | 5/1999 | Upp ......................................... | 370/389 |
| 5,926,628 | 7/1999 | Tran et al. .............................. | 395/293 |
| 5,931,931 | 8/1999 | Nguyen ................................... | 710/113 |

*Primary Examiner*—Ayaz R. Sheikh
*Assistant Examiner*—Tim Vo
*Attorney, Agent, or Firm*—Michael Pritzkau; Stephen C. Shear

[57] ABSTRACT

A method and associated arrangement for use in priority allocation in a bus interconnected digital multi-module system are disclosed. The modules are configured for requesting the use of the bus with each module being granted its request based upon its priority. During the operation of the system, a set of priorities is established such that the number of priorities is equal to the number of modules in the system. Each module is assigned to an initial priority. During the operation of the system, modules may be reassigned to a priorities which are different than their initial priorities. In addition, the priorities may be grouped in an initial group arrangement which may be reconfigured. The group arrangement may be reconfigured in any desired manner. Also, provisions are made for refusing a grant to a module even though that module possesses the highest priority among requesting modules.

13 Claims, 5 Drawing Sheets

FIG. 1

SPEED DIAGRAM
FIG. 4

MAP DIAGRAM
FIG. 5

ROTATE DIAGRAM

FIG. 6

ROTATE MODULE SIGNALS

FIG. 7

PRIORITY ALLOCATION IN A BUS INTERCONNECTED DISCRETE AND/OR INTEGRATED DIGITAL MULTI-MODULE SYSTEM

CROSS-REFERENCE TO RELATED APPLICATION

The present application is a continuation-in-part of U.S. patent application Ser. No. 08/863,875 now U.S. Pat. No. 5,983,303 (Attorney Docket No. FUS-P001), entitled "BUS ARRANGEMENTS FOR INTERCONNECTION OF DISCRETE AND/OR INTEGRATED MODULES IN A DIGITAL SYSTEM AND ASSOCIATED METHOD", filed May 27, 1997 and U.S. patent application Ser. No. 08/942,011 (Attorney Docket No. FUS-P002), entitled "SYNCHRONOUS LATCHING BUS ARRANGEMENT FOR INTERFACING DISCRETE AND/OR INTEGRATED MODULES IN A DIGITAL SYSTEM AND ASSOCIATED METHOD", filed Oct. 1, 1997, both of which are incorporated herein by reference.

BACKGROUND OF THE INVENTION

The present invention relates generally to bus priority allocation in a digital system and more particularly to a method of allocating access in a bus arrangement among a plurality of discrete and/or integrated modules and an associated apparatus.

Many schemes have been implemented for purposes of providing prioritized access to bus arrangements in digital systems. One of skill in the art will readily recognize that the concept of priority in a digital system is crucial since certain components or modules such as, for example, a CPU require low latency accesses to the bus arrangement. At the same time, however, other groups of components or modules may require access to the bus arrangement in a way which provides for reasonably low latency access and for fairness among the groups, particularly in instances where the various components or modules which make up these groups are in substantially continuous contention for the use of the bus arrangement. It is submitted that bus contention between module/component groups has become a significant problem in view of the recent and continuing movement toward streaming type processing environments since bus arrangements experience higher utilization levels, as will be further discussed at an appropriate point below.

In prior art systems, groups of modules or components which require substantially equal bus access are pre-assigned the same (hereinafter multi-assigned) priority level. Thereafter, during the operation of such a system, some sort of mechanism is employed each time a multi-assigned priority level is to receive a bus grant so as to delegate the grant to one of that level's multi-assigned modules in an attempt to ensure fair bus access. For example, a random number generator may be utilized in determining which module actually receives the bus grant. Unfortunately, the aforedescribed scheme adds considerable complexity through the need for the mechanism which is required to select one module from a group of multi-assigned modules which are on a particular priority level.

Another concern with regard to past priority allocation implementations relates to flexibility. Specifically, typical priority allocation implementations do not provide for adjusting relative priorities of components/modules during the operation of the system. That is, once an initial priority configuration has been established at system startup, that startup configuration is maintained for the duration of system operation. This inflexibility may be disadvantageous in a variety of different circumstances as the operation of a system progresses. For example, processing may move from a first task using one group of modules to a second task using another group of modules. If system priorities do not adjust accordingly, the overall throughput of the system may suffer.

As mentioned briefly above, still another concern resides in the problem of bus contention with regard to the way in which priority allocation implementations of the past operate in a streaming environment. Specifically, it should be appreciated that different modules interconnected by one bus arrangement may possess different data transfer capabilities. In many instances, these differences in transfer rate capabilities are handled by using a buffer to store data at a rate which is determined by a source module. Thereafter, the data is transferred to a destination module over the bus arrangement at a rate which is determined by the destination module. Buffering, however, is disadvantageous for several different reasons. As a first reason, relatively expensive local memory is required at one of the modules to perform the buffering task whereby to increase overall costs. As a second reason, this buffering approach is inherently inconsistent with an efficient streaming environment as is contemplated by the present invention.

As will be seen hereinafter, the present invention provides a highly advantageous priority allocation approach and associated apparatus which resolve the foregoing concerns and which provides still further advantages that have not been seen heretofore.

SUMMARY OF THE INVENTION

As will be described in more detail hereinafter, there is disclosed herein a method and associated arrangement for use in priority allocation in a bus interconnected digital multi-module system which may include discrete and/or integrated modules.

In one aspect of the invention, at least one bus interconnects a plurality of modules in a predetermined way. During the operation of the system, each of the modules is configured for requesting the use of the bus with each module being granted its request based on an established scheme of priorities. Each module is assigned to an initial priority and, during the operation of the system, at least one module is reassigned to a priority which is different than its initial priority.

In another aspect of the invention, it is established that a particular module, based on a request made by that module, has the highest priority for the use of the bus in relation to any other modules concurrently requesting the use of the bus. Nevertheless, the grant of the bus to that particular module is refused with the bus being granted to a different module based on predetermined parameters. In one embodiment, the predetermined parameters include priority allocation. In one feature, bus grants may be determined based, at least in part, on "speed values" assigned to the modules. The speed values are determined in view of relative data transfer capabilities (i.e., data rates) of the modules.

In still another aspect of the invention, a bus arrangement includes at least one bus which interconnects at least three modules in a predetermined way. Each of the modules is capable of requesting the use of the bus and each module is granted its request based on an established scheme of priorities. During operation of the system, a set of priorities is established for use as the scheme of priorities such that the number of priorities is equal to the number of modules in the system. Thereafter, one module is assigned to each priority such that subsequent grants of the bus are made based, at least in part, upon the priorities.

In one feature, one module which receives a grant, based on the priorities, and at least one other module are reassigned to different ones of the priorities.

In another feature, at least two priority groups are established for use in granting module requests such that each priority group includes a relative priority in relation to the other group or groups and each priority group includes a predetermined number of priority levels such that the total number of priority levels among all of the priority groups is equal to the total number of modules. When two or more modules within different priority groups simultaneously request the use of the bus, arbitration is performed among the requesting modules based, at least in part, on the relative priority levels of the priority groups to which the requesting modules belong so as to determine a winning priority group. Thereafter, the use of the bus is granted to the requesting module within the winning priority group.

In still another feature, at some point during the operation of the system, a new arrangement of priority groups is established which is different than an initially established priority group arrangement such that each new priority group includes a new relative priority in relation to the other new priority groups. The modules are then reassigned to the new priority groups such that when two or more modules within different new priority groups simultaneously request the use of the bus, arbitration among the requesting modules may be performed based, at least in part, on the new relative priorities of the new priority groups so as to determine a winning priority group. Thereafter, the bus is granted to the requesting module within the winning priority group.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
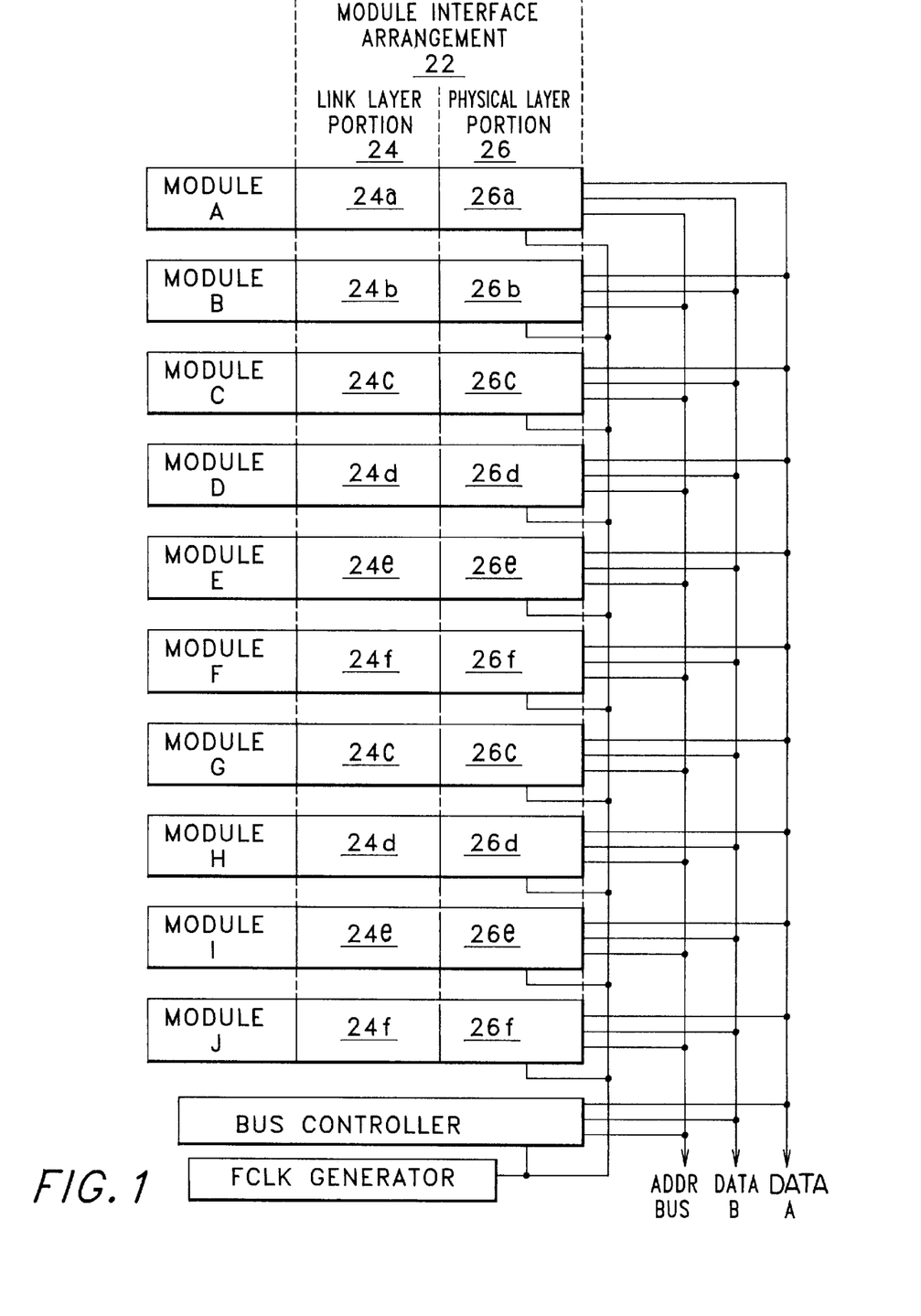
FIG. 1 is a block diagram illustrating a digital multi-module system which is implemented in accordance with the present invention.

Attention is immediately directed to FIG. 1 which illustrates one embodiment of a digital system manufactured in accordance with the present invention and generally indicated by the reference numeral 10. System 10 includes a plurality of ten modules which are indicated as modules A through J. It is to be understood that modules are selected from a functional standpoint based upon the intended application or applications of system 10. Modules A–J may be selected from, but are not limited to the six modules shown and described in the above incorporated U.S. applications. Moreover, it is noted that ten modules are incorporated in system 10 of the present application for purposes of providing sufficient variation in illustrating contention for bus priority, as will be seen below. In addition, the modules are referred to in a more generic sense for reasons which are thought to more effectively illustrate the inventive features taught herein.

System 10 further includes a bus arrangement implemented in accordance with the concepts taught in the above incorporated U.S. applications and generally indicated by the reference number 20. Bus arrangement 20 includes a module interface arrangement 22 which is comprised of a link layer portion 24 which interfaces directly with a physical layer portion 26. Link layer portion 24 provides the individual modules in the system with an interface to the overall bus arrangement in the form of individual link layers 24a–j. Physical layer portion 26 includes a plurality of individual physical layers 26a–j which are associated with respective link layers 24a–j. The reader is referred to the above incorporated U.S. applications for a detailed description of module interface arrangement 22 along with its link layer portion 24 and physical layer portion 26. Physical layers 26a–j are each, in turn, connected with bus arrangement 20. In the present example, bus arrangement 20 includes an address bus 30, a data bus A (indicated by reference number 32) and a data bus B (indicated by reference number 34). Modules A–J are each connected with address bus 30. For purposes of simplicity, each module is illustrated as being connected with both data buses, however, it should be appreciated that a particular module may be connected with only one data bus, as discussed in the incorporated applications.

Still referring to FIG. 1, in accordance with the present invention, bus arrangement 20 is completed by a bus controller module 40 which is designed in accordance with the present invention and which is connected with address bus 30 and both data buses. It is noted that physical layer connection of the bus controller varies from that of other modules, as will be described in conjunction with a more detailed discussion below. At this point, it is worthy of mention that the concepts taught herein are applicable to multiplexed bus arrangements in which a single bus serves to transfer both address and data information; a bus arrangement including a single address bus and a single data bus, and a multiple data bus arrangement including an address bus associated with two or more data buses. In such alternative implementations, the bus controller is connected with the address bus and each data bus, irrespective of the number of individual data buses. Of course, in a multiplexed bus system, the bus controller is connected with the multiplexed bus. Bus controller 40 serves in all bus arbitration and allocation needs. As will be further described below, the bus controller of the present invention implements a heretofore unseen and highly advantageous priority allocation scheme. Specific details regarding the construction of the bus controller will be provided within the context of a more detailed discussion below.

System 10 further includes an FCLK generator 50, which may also be referred to herein as a master clock signal generator. As will be described at appropriate points hereinafter, the master clock signal generator provides an FCLK signal to bus controller 40 and to the physical layer associated with each module within system 10 using an arrangement of leads 52. As described in the above incorporated U.S. applications, system 10 (in particular, the physical layer) utilizes the FCLK signal in a highly advantageous and heretofore unseen way which serves to coordinate the transfer of addressing and data information throughout the system using bus arrangement 20.

Turning now to Table 1 in conjunction with FIG. 1, after having provided a basic discussion of system 10, a discussion of the features of the priority allocation method of the present invention will now be provided. It is to be understood that the concepts of the present invention are in no way limited to use in the hardware implementation of system 10, but may be used in any system which requires priority allocation between modules or other such components. To that end, Table 1 includes a priority register column having ten priority levels 0–9 with level 0 being the highest priority level. A group number column specifies a module priority group assignment for each module. As will be seen, the priority allocation method of the present invention provides for a great deal of flexibility with regard to grouping of the priority levels, 0–9, and with regard to the way in which the modules are assigned to the priority levels. At this point, it is mentioned that one feature of the present invention resides in the assignment of modules to priorities. In prior art priority allocation schemes, exactly the opposite teaching is typically found, as described previously, resulting in rather complex additional provisions such as, for example, multi-assignment of modules to one priority level in an attempt to provide fair bus resource access among a group of modules. As will be seen, in accordance with the present invention, the concept of assigning modules to priorities in an unambiguous priority allocation scheme is highly advantageous in a number of important ways. For example, it is submitted that the priority allocation method of the present invention provides levels of fairness and efficiency in module bus access which have not been seen heretofore.

Figure 2:
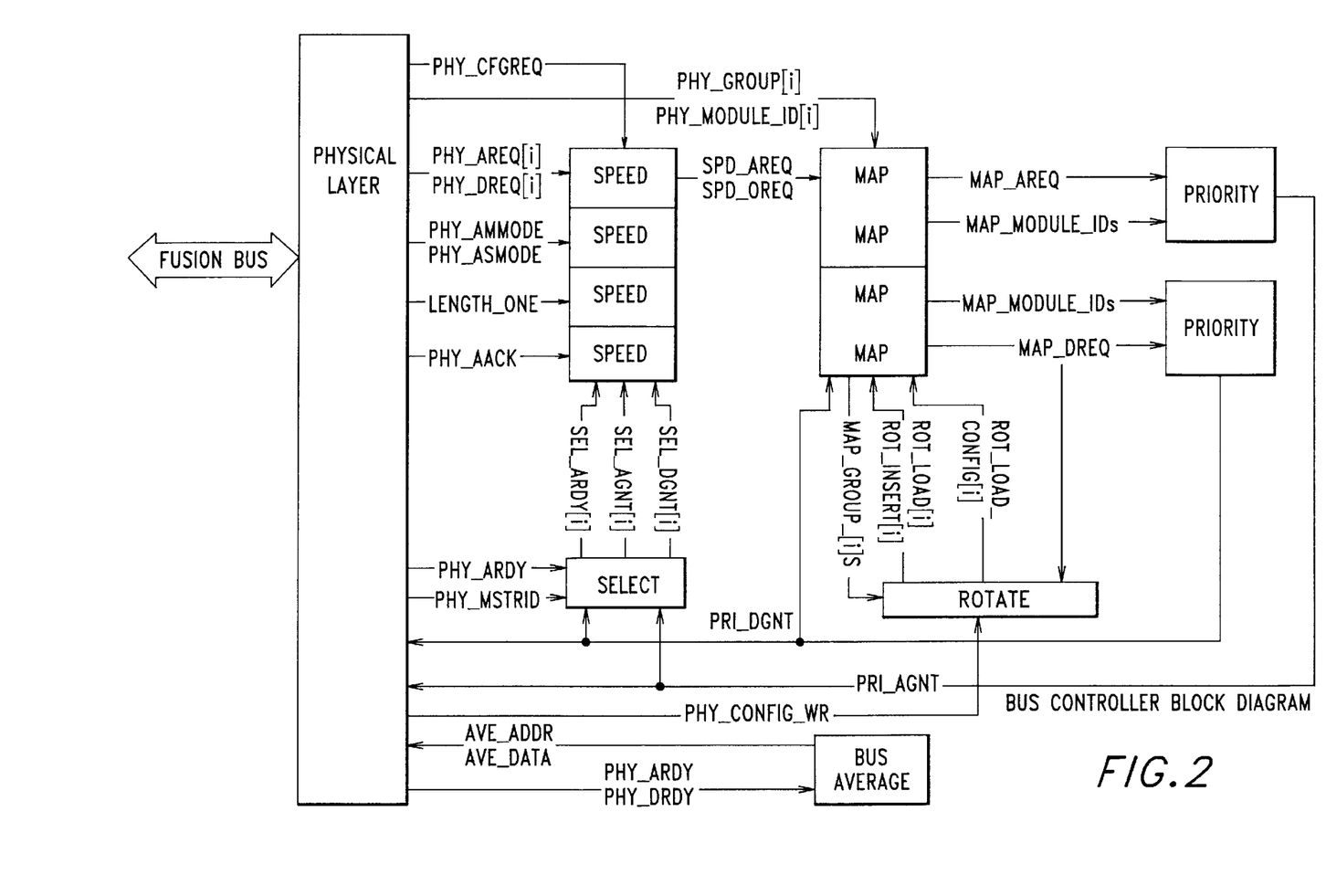
FIG. 2 is a block diagram illustrating a bus controller manufactured in accordance with the present invention.

Referring to Table 2 in conjunction with Table 1 and FIG. 2, during startup of system 10, a configuration mode is executed in which module priority groups 1–5 are established within an initial priority group arrangement. It is noted that modules A–J are assigned to priority levels 0–9, respectively, for purposes of simplicity and that any alternative arrangement could be employed, depending on the configurations of specific ones of the modules. The initial group priority arrangement of Table 2 is present during FCLK 1, as established by the configuration mode. Each of the five priority groups are assigned as either a Fixed Priority Allocation (hereinafter FPA) group or a Shared Priority Allocation group (hereinafter SPA). Details regarding the specific way in which FPA and SPA groups function will be provided at an appropriate point below. In the initial priority group arrangement of Table 2, Module A is solely assigned to group 1 (FPA), modules B–E are assigned to group 2 (SPA), modules F and G are assigned to group 3 (FPA), modules H and I are assigned to group 4 (SPA) and module J is solely assigned to group 5 (FPA). One of skill in the art will appreciate that an SPA module group must include at least two modules, as will become evident.

In accordance with the present invention, it is observed in Table 1 that each module is assigned to a single priority level. Therefore, the number of modules/components to be allocated priority levels (i.e., normally the number of modules in the system) must be equal to the number of available priority levels, as defined by the module priority groups. As will be seen, this concept results in the highly advantageous ability to unambiguously determine a priority grant in a single operation using no more than the defined priority allocation arrangement illustrated in Table 1 at any particular time during the operation of system 10, irrespective of any number of simultaneously asserted requests. As discussed above, the prior art relies on concepts such as assigning a number of modules to one priority level and thereafter using a separate mechanism to grant priority to a single one of the

TABLE I

| PRIORITY REGISTER | GROUP NO. | GROUP TYPE | FCLK 1 | FCLK 2 | FCLK 3 | FCLK 4 | FCLK 5 | FCLK 6 |
|---|---|---|---|---|---|---|---|---|
| 0 | 1 | FPA | A/R* | A | A | A | A | A |
| 1 | 2 | SPA | B | B | B | B | B | B |
| 2 | 2 | SPA | C | C | C/R* | D/R* | E/R* | D |
| 3 | 2 | SPA | D | D | D/R | E | C/R* | E |
| 4 | 2 | SPA | E | E | E | C | D | C |
| 5 | 3 | FPA | F | F/R* | F | F | F | F |
| 6 | 3 | FPA | G | G | G | G | G | G |
| 7 | 4 | SPA | H | H | H | H | H | H |
| 8 | 4 | SPA | I | I | I | I/R* | I | I |
| 9 | 5 | FPA | J | J | J | J | J | J |

/R = REQUEST PENDING
* = WINNING REQUEST
FPA = FIXED PRIORITY ALLOCATION
SPA = SHARED PRIORITY ALLOCATION

TABLE 2

| GROUP NO. | INITIAL MODULE GROUP ASSIGNMENTS (FCLK 1) | | | | |
|---|---|---|---|---|---|
| | 1 | 2 | 3 | 4 | 5 |
| ASSIGNED MODULES | A | B–E | F, G | H, I | J |
| GROUP TYPE | FPA | SPA | FPA | SPA | FPA | modules among the group of multi-assigned modules. While this may provide fair access, it should be appreciated that such prior art priority allocation arrangements rely on at least two separate mechanisms in ultimately granting priority to a single module in the instance of multiple module requests. In contrast, the unambiguous priority table of the present invention eliminates the need for additional mechanisms in establishing a particular module's priority at any time during the operation of system 10.

Referring again to Table 1 and FIG. 1, general details regarding the FPA and SPA groups will now be provided in accordance with the teachings of the present invention during a consecutive series of illustrative FCLK cycles. Turning first to FPA groups, priority levels of modules assigned to an FPA group remain unchanged with subsequent operation of system 10. For instance, group 1 consists solely of module A. When a bus allocation request is asserted and granted (indicated by "A/R*" in the FCLK 1 column of Table 1) for module A, there is no change in the priority level of module A during subsequent operations. That is, module A has the highest priority in the system and continues to retain it. Therefore, subsequent bus allocation requests made by module A are granted unless other inventive features to be described below are invoked. It should be appreciated that, for this reason, priority level 0 is typically occupied by a synchronous device such as, for example, a communication device or display controller so as to ensure the device receives guaranteed access to the bus arrangement. In the dual data bus arrangement of system 10, priority may also be used as one consideration in establishing, at least in part, which data bus is granted to module A.

Operational characteristics of FPA groups are further illustrated by a request made by module F in FCLK 2. This request is granted since no higher priority requests are pending. As can be seen in FCLK 3, the priority levels of modules F and G in group 3 are unchanged. In a similar manner, a grant (not shown) to group 5 module J will not affect its priority.

Having discussed the characteristics of FPA groups, it should be appreciated that the nature of SPA groups is somewhat more complex since the purpose of the SPA group resides in the provision of fair resource allocation among the modules which make up a particular module group. In accordance with the present invention, modules within an SPA group are reassigned to different priority levels within that group in the event that one of the modules receives a data resource grant. That is, priority reassignment occurs only in association with granting the use of a data bus in the instance of system 10. In a more generic sense, an SPA module may be reassigned in priority only after a grant for the purpose of transferring data. As an example, in FCLK 3, modules C and D (group 2) are assumed to be in contention for the same bus resource by virtue of simultaneous requests. Since module C has a higher priority during FCLK 3, it wins arbitration performed by the bus controller. Thereafter, the module priorities for group 2 are reassigned as they appear in FCLK 4 in accordance with a Least Recently Used (hereinafter LRU) priority rotation. That is, the winning module is reassigned to the lowest priority level of the group while each module below the level of the winning module moves up in priority by one level. Like the remaining modules, module D (asserting a data request in FCLK 3) moves up in priority by one level since it did not receive the data grant for use of the bus arrangement during FCLK 4.

Continuing to refer to FIG. 1 and Table 1, it is noted that two modules may simultaneously receive data bus grants since system 10 includes two data buses. For example, in FCLK 4, data requests are asserted by module D of group 2 and by module I of group 4. Assuming that module D seeks to transfer data to module A on data bus A while module I seeks to transfer data to module F on data us B, the bus controller may grant data bus A to module D and data bus B to module I. Thus, the associated transfers will occur simultaneously at least during FCLK 5. With regard to group 2 LRU priority rotation, in FCLK 5, module D is reassigned to priority level 4 while modules E and C are reassigned to priority levels 3 and 4, respectively. In group 4, modules H and I are reassigned to the same priority levels since group 4 is comprised of two priority levels of which the module receiving the grant (module I) was already in the lowest level of group 4.

In the instance of FCLK 5, modules C and E of priority group 2 are asserting requests. Assuming that these modules are simultaneously requesting and granted the use of different data buses, modules C and E are reassigned to the two lowest priority levels within their group while the remaining modules, depending upon their relative positions, may move up in priority by one or more levels. In this particular example, module C is reassigned to priority level 4 while module E is reassigned to priority level 3. Therefore, module D is reassigned from priority level 4 to priority level 2; a jump of two priority levels. Accordingly, in multiple data bus systems, certain modules may move up in priority by a number of priority levels which is equal to the total number of data buses. It should be noted that the reassignments of modules C and E to priority levels 3 and 4 may be performed in any number of alternative ways. For example, modules C and F may be reassigned to priority levels 3 and 4, respectively (not shown). From a practical standpoint, such reassignments may be performed in an arbitrary fashion since the overall effect on system operation is not typically significant. As a more straightforward alternative, one of the modules can remain at its FCLK 5 priority level. That is, module C might be reassigned in FCLK 6 to priority level 4 while module E is left in priority level 2 (not shown). Again, it is considered that maintaining a module in the same priority level will, in most cases, have a negligible impact with regard to priority allocation due to averaging considerations.

It should be noted that a module in an SPA group which is granted a bus resource for data purposes without the contention of another module is moved to the lowest priority level of its group essentially as if contention had occurred. Moreover, it is to be understood that LRU priority rotation represents only one highly advantageous method of determining priority amongst a plurality of contending modules within an SPA group so as to ensure fair allocation of bus resources. In accordance with the present invention, any suitable implementation either known or to be discovered may be substituted for LRU priority rotation.

Attention is now directed to Tables 3 and 4 in conjunction with FIG. 1. In accordance with the present invention, the initial priority group arrangement illustrated by Table 2, may be modified in an unlimited number of highly advantageous ways during the operation of system 10. Table 3 illustrates a new priority group arrangement which, unlike the initial arrangement of Table 2, includes four different groups. Additional comparison of Tables 3 and 4 with Tables 1 and 2 reveals that the configuration of the new priority arrangement is quite different in many other respects from that of the initial priority group arrangement. Specifically, the new priority group arrangement includes an FPA group 1' which is made up of modules A through E (module A remains in priority register 0 under the assumption that this module represents the host processor), an SPA group 2' including modules F and I; another SPA group 3' including modules J and G; and an FPA group 4' consisting solely of module H. It is to be understood that the new priority group arrangement has been selected in a way which is thought to effectively illustrate the flexibility of the priority allocation method of the present invention. With the exception of module A, no attempt has been made to arrange these illustrative new priority groups or the modules contained therein with regard to specific module functionality. The reassignment of modules to a new priority group structure, as contemplated by the present invention, represents an opportunity during system operation to tailor priority grouping in light of changing operational parameters such as, for example, switching from a first primary processing task to a second primary processing task. In this way, group priorities may immediately be made to match anticipated priority needs which correspond to subsequent processing tasks.

TABLE 3

| PRI REG | GRP NO | GROUP TYPE | FCLK 7 | FCLK 8 | FCLK 9 | FCLK 10 | FCLK 11 | FCLK 12 | FCLK 13 | FCLK 14 | FCLK 15 | FCLK 16 |
|---|---|---|---|---|---|---|---|---|---|---|---|---|
| 0 | 1' | FPA | A/R1* | A/R2* | A | A | A | A | A | A | A | A |
| 1 | 1' | FPA | D/R1* | D/R2d | D/R2d | D/R2d | D/R2* | D | D | D | D | D |
| 2 | 1' | FPA | B/R1 | B/R1* | B/R2d | B/R2* | B | B | B | B | B | B |
| 3 | 1' | FPA | C/R1 | C/R1 | C/R1* | C/R2d | C/R2d | C/R2* | C | C | C | C |
| 4 | 1' | FPA | E/R1 | E/R1 | E/R1* | E/R2d | E/R2d | E/R2d | E/R2d | E/R2* | E | E |
| 5 | 2' | SPA | F | F | F | F | F | F | F | F | F/R1* | I |
| 6 | 2' | SPA | I | I | I | I | I | I | I | I | I/R1 | F |
| 7 | 3' | SPA | J | J | J | J | J | J | J | J | J/R1* | G |
| 8 | 3' | SPA | G | G | G | G | G | G | G | G | G | J |
| 9 | 4' | FPA | H | H | H | H | H | H | R | H | H | H |

/R# = REQUEST PENDING
/R#d = REQUEST DENIED
* = WINNING REQUEST
FPA = FIXED PRIORITY ALLOCATION
SPA = SHARED PRIORITY ALLOCATION

TABLE 4

NEW MODULE GROUP ASSIGNMENTS (FCLK 7)

| GROUP NO. | 1' | 2' | 3' | 4' |
|---|---|---|---|---|
| ASSIGNED MODULES | A–E | F, I | G, J | H |
| GROUP TYPE | FPA | SPA | SPA | FPA |

With regard to the operation of system 10, it is noted that the new priority group arrangement was established subsequent to FCLK 6 (see Table 1) when no priority requests were pending. This represents only one technique for performing a priority group rearrangement. Alternatively, a number of different types of reconfiguration modes could be entered which would, for example, consider pending requests occurring at the time of priority group rearrangement. As one example, pending requests in FCLK 6 might simply be carried forward with associated modules for entry in the appropriate priority levels of the FCLK 7 column of Table 3. Of course, in the case of modules within an SPA group, the appropriate priority levels may be reassigned in accordance with LRU priority rotation, described above. Such configuration modes are advantageous since a new priority group arrangement may be established at any time during the operation of the system, irrespective of pending requests. Having established the new priority group arrangement of Table 3, operation of system 10 may proceed thereunder. It should be appreciated that the FPA and SPA groups of Table 3 function in accordance with the foregoing descriptions of these groups.

Turning now to Table 5 in conjunction with Table 3 and FIG. 1, each module is assigned a "speed" value as designated by Table 5.

TABLE 5

MODULE SPEED ASSIGNMENT
(applicable to FCLK 7–16)

| MOD. | A | B | C | D | E | F | G | H | I | J |
|---|---|---|---|---|---|---|---|---|---|---|
| SPEED | 0 | 1 | 2 | 3 | 4 | 0 | 0 | 0 | 0 | 0 |

It should be emphasized that the speed values designated by Table 5 have been selected for illustrative purposes. In an actual system, the speed values are chosen based upon factors to be described. In accordance with the present invention, the speed value of each module designates a minimum number of FCLK cycles between bus grants for purposes of data transfers. In other words, even if a particular module requests the use of a data bus from the highest requesting priority level, that request may be refused or ignored by bus controller 40 based on the module's speed value in spite of the fact that the module would otherwise win the use of the bus by virtue of possessing the highest requesting priority level. Further in accordance with the speed concept of the present invention, each module continues to assert its request until such time that the bus controller grants the request. An understanding of these teachings will be provided by working through the priority contention situation which is set up by five simultaneous data transfer requests occurring during FCLK 7, as will be described immediately hereinafter.

Continuing with a description of Table 3, it should be appreciated that these teachings apply to data transfers which are large enough to encompass a great number of contiguous, interleaved or intermittent FCLK cycles. The five simultaneous requests referred to above are being asserted by modules A through E from their respective priority levels in FCLK 7 and are indicated by appending the nomenclature "/R1" to each module's identifying letter so as to indicate a first request (in Table 3) asserted. In order to facilitate the reader's understanding, modules A through E comprise FPA group 1' such that module priority level reassignment (i.e., LRU priority rotation) is not required with data grants. That is, each of modules A–E remains in the same priority level as assigned in FCLK 7, irrespective of data grants. However, it is to be understood that the present invention contemplates the use of the speed concept in SPA priority groups as well as FPA priority groups.

Subsequent to the multiple requests in FCLK 7, data bus arbitration is performed by bus controller 40 in FCLK 8. Accordingly, module A possesses the highest priority with a speed value of 0. Therefore, module A wins arbitration during FCLK 7 as indicated by the nomenclature "A/R1*". Essentially, module A, due to a speed value of 0, is capable of receiving a grant on every FCLK cycle for which it asserts a request. Of the remaining modules that are asserting first requests, module D is at the next highest priority level. Therefore, assuming module A is granted data bus A, module D may be requesting and thus granted data bus B, as indicated by "D/R1*".

In FCLK 8, module A asserts a second request indicated as "A/R2*" and is, once again, granted data bus A. It should be appreciated that the R2 request made by module A may be a continuation of the data transfer begun in FCLK 7 (i.e., R1 and R2 may comprise a single, continuously asserted request) or R2 may represent a new data transfer, for example, to or from a different module than the module which was the object of the data transfer initiated in FCLK 7 for the R1 request. At the same time, modules B, C and F continue to assert their first requests while module D immediately asserts a second request. However, note that module D has a speed value of 3. Therefore, its request for a data transfer resource must be denied at least for FCLK 8, 9 and 10 as indicated by the entries "D/R2d" in Table 3 even though module D is at the highest requesting priority level over these FCLK cycles. Module B, based upon its continued assertion of a first request, is granted data bus B.

Arbitration in FCLK 9 finds that module D continues to assert its second request while module B immediately asserts its second request. However, since module B has a speed value of 1, its request is refused in FCLK 9 as indicated by "B/R2d" while the second request of module D continues to be denied. The module having the next highest priority is module C which continues to assert its first request. At the same time, module E continues to assert its first request. Therefore, data buses A and B may be granted to modules C and E, respectively, assuming that they are requesting different data buses.

In FCLK 10, modules C and E each immediately assert second requests. Module D remains under request denial based upon its receipt of a grant in FCLK 7. The second requests of Modules C and E are denied based on grants in FCLK 9 in conjunction with respective speed values of 2 and 4, respectively. Therefore, the second request of module B is granted since module B is the only requesting module in FCLK 7 which is not under request denial.

Operation proceeds in FCLK 11 with no new requests asserted, however, request 2 of module D is no longer under denial and is therefore granted on one of the data buses. Even though a second data bus is available, the second requests of modules C and E remain under denial.

In FCLK 12, module C is no longer under request denial while module E remains so. Therefore, module C is granted one of the data buses. No changes occur in FCLK 13 since module C is still under request denial and no new requests are pending.

FCLK 13 finds that the second request of module E is no longer under denial and is therefore granted on a data bus. Thus, each of modules A–E has received two data bus grants under the constraints imposed by the speed concept of the present invention. FCLK cycles 14–16 will be described at an appropriate point below.

It should be appreciated that the overall concept of speed value is highly advantageous with regard to maintaining efficient bus usage. For instance, this advantage is readily apparent in instances where allocation of a bus resource to a particular module or modules would result in wasted clock cycles due to wait states. In this regard, modules may readily be incorporated into system 10 which are capable of transferring data at different maximum rates. In such a case, data transfer between two modules may be performed in an efficient manner by selecting tile highest speed value (i.e., slowest data transfer rate) assigned to the two modules. By using this approach, data is transferred between the subject modules intermittently based on the speed value. For example, in system 10, using the speed values of Table 5, all data transfers involving module E are performed using a speed value of 4 since this represents the "slowest" assigned speed value among all of the modules. In this way, data is transferred no more often than on every fifth FCLK cycle. As another example, if a data transfer were to be performed between modules B and D, a speed value of 3 would be applied to the transaction meaning that data is transferred no more often than on every fourth FCLK cycle. In addition, speed values are uniquely useful in consideration of a two clock cycle delay which is introduced by the highly advantageous interface arrangement employed in the above incorporated U.S. applications. Further mention will be made of this two clock cycle delay at an appropriate point below. It should be mentioned that one particular detailed feature of the priority allocation method of the present invention, which has not been seen heretofore by Applicants, resides in the idea of selectively rejecting or postponing a "winning" bus allocation request.

Referring briefly again to Table 3, it is of interest to note that SPA groups 2' and 3' are immediately adjacent one another. Even though these groups are immediately adjacent one another, they are treated by the bus controller as separate entities with corresponding relative group priority levels. For example, in FCLK 15, requests are asserted by modules F, I and J. It is noted that speed values are not of concern in the immediate example since the subject modules have assigned speed values of zero (see Table 5). Assuming, for example, that module F requests data bus A, module I requests data bus B and module J requests data bus A, bus controller 40 performs a separate arbitration for each data bus. In this example, arbitration for data bus A compares the priority of module F in group 2' with the priority of module J in group 3, granting data bus A to module F. A separate arbitration for data bus B is, of course, won by module I since no other modules are simultaneously requesting this bus. In this regard, it should be noted that a separate priority table may be maintained for each data bus as a viable alternative to the system priority table illustrated by Tables 1 and 3 since each module request specifies a particular data bus. It is also noted that bus requests in multiple data bus arrangements specify a particular data bus for purposes which include reducing the complexity associated with long data transfers. That is, a transaction which extends over a plurality of FCLK cycles (either sequential or intermittent) is always performed on the same data bus.

It is to be understood that the foregoing discussion does not consider certain aspects of the aforementioned two cycle delay with respect to the FCLK signal, as implemented in accordance with the above incorporated U.S. applications. Certain advantageous provisions, for example, with regard to speed and the assertion of module requests, have been made in these applications as a direct consequence of the two cycle delay. However, these provisions will be addressed in a subsequent detailed discussion.

Using the specification to this point, FIG. 1 and Tables 1–5, it is considered that one of ordinary skill in the art may readily practice the present invention in view of the teachings therein. However, for further explanatory purposes, the priority allocation method and bus controller of the present invention will be described in more detail in conjunction with FIGS. 2–8. It is noted that the term FusionBus, as seen hereinafter, is intended to be a bus arrangement manufactured in accordance with the present invention and is a trademark of Fusion MicroMedia Corporation, Longmont, Col.

Fusion Bus Controller Functional Description

The Fusion Bus Controller arbitrates access to the Fusion address and data busses. On each FusionBus cycle, it examines the address and data bus requests and grants the address and data busses to the highest priority module requesting each bus. Each module is assigned to a priority level in the Bus Controller. A single priority ranking is used for both address and data bus arbitration. The priority mechanism supports modules at a fixed priority and modules that change their priority dynamically based on a Least Recently Used (LRU) algorithm.

Each burst transaction on FusionBus has an associated speed that indicates the minimum number of FusionBus cycles between successive data bus grants. The Bus Controller insures that a data bus is granted to a requester no more often than is allowed by the burst transaction speed. This allows the burst transaction source to ignore the speed and request the data bus whenever transaction data is ready.

The Bus Controller also monitors the activity on FusionBus and records statistics in registers that are accessed through the configuration mechanism.

Features

Fully Prioritized Arbitration

Flexible arbitration configurations to support wide variety of system requirements High priority modules have guaranteed latency and bandwidth 3 Independent LRU groups provide fair access to FusionBus Bus statistics for system monitoring and tuning Design Goals Minimize arbitration latency. Any latency in either address or data bus arbitration adds directly to the latency for every FusionBus transaction. Single cycle arbitration is the most desirable solution.

Modular approach that can be configured for varying number of bus masters.

Architecture

Priority Allocation

Priority is used in the Bus Controller to arbitrate among multiple requests for the same bus (address or data). Each FusionBus module is assigned to a priority level. Only one module is assigned to each priority level, so the priority unambiguously selects the highest priority requester for each bus. The same module to priority level assignment is used for both address and data bus arbitration.

A priority level is either fixed or a member of an LRU group. A fixed priority level is always contains the same module assignment. The module assignment for a LRU member priority level varies among a group of member modules. When an LRU module is granted a data bus, it is assigned the lowest priority in the LRU group and all the modules in the LRU group that have a lower priority than the granted module have their priority increased by one. No priority changes occur in conjunction with an address grant.

Each priority level has an associated register in the Bus Controller configuration space designated PRI00 through PRI30. PRI00 is the highest priority level and the number of registers implemented match the number of modules that can operate as a FusionBus master. Each register is 8 bits and contains a 2 bit Group field and a 5 bit Module ID field. A Group field value of 0 indicates that a priority level is fixed. A Group field value of 1, 2, or 3 indicates that the priority level is a member of one of the three LRU groups. The Module ID field indicates the module currently assigned to the priority level. The Module ID field is set to a constant value for priority levels with Group set to 0. For priority levels with a non-zero Group field value, the Module ID changes over time, but always has one of the Module ID values initially assigned to a priority level with the same Group value.

Before FusionBus transactions (other than configuration cycles) can occur, software must set the value for each priority register with the Group and Module ID values using the configuration mechanism. The Module ID for each FusionBus master must be written to exactly one priority register. Priority registers with a non-zero Group value must be contiguous with all other priority registers with the same Group value. Table 1–1 shows a possible initial setup for a Bus Controller for 10 masters. Note that the Bus Controller has Module ID 1 and does not appear in one of the priority registers. The priority registers may be read using the configuration mechanism during operation to observe the current state of the priority registers.

TABLE 1-1

Initial Priority Setup

| Register | Group | Module ID | Group Description |
|----------|-------|-----------|-------------------|
| PRI00 | 0 | 0x00 | Fixed |
| PRI01 | 2 | 0x08 | LRU Group 2 |
| PRI02 | 2 | 0x03 | |
| PRI03 | 2 | 0x04 | |
| PRI04 | 2 | 0x02 | |
| PRI05 | 0 | 0x09 | Fixed |
| PRI06 | 0 | 0x07 | |
| PRI07 | 1 | 0x06 | LRU Group 1 |
| PRI08 | 1 | 0x0A | |
| PRI09 | 0 | 0x05 | Fixed |

Table 1–2 shows the contents of the priority registers after module 0x03 has been granted the data bus. Module 0x03 is a member of LRU group 2 and is rotated to the lowest priority level in LRU group 2.

TABLE 1-2

Priority Registers After Grant

| Register | Group | Module ID | Group Description |
|----------|-------|-----------|-------------------|
| PRI00 | 0 | 0x00 | Fixed |
| PRI01 | 2 | 0x08 | LRU Group 2 |
| PRI02 | 2 | 0x04 | LRU Group 2 |
| PRI03 | 2 | 0x02 | LRU Group 2 |
| PRI04 | 2 | 0x03 | LRU Group 2 |
| PRI05 | 0 | 0x09 | Fixed |
| PRI06 | 0 | 0x07 | Fixed |
| PRI07 | 1 | 0x06 | LRU Group 1 |
| PRI08 | 1 | 0x0A | LRU Group 1 |
| PRI09 | 0 | 0x05 | Fixed |

If there are no requests for a bus, tile bus is granted to the Module ID 0. By parking the bus grant at the Fusion Host Interface, the 4 cycle latency to perform the bus arbitration is avoided when the bus is not used by another module. The contents of the priority registers are not changed when a data bus is granted to the Module ID 0 unless there was a corresponding request from Module ID 0. This prevents LRU rotations based on parked data grants when the grant may not be used.

Address Request Cycling

A module that wishes to use an address cycle asserts its address request FB_AREQ. After a module is granted the address bus, the Bus Controller ignores these subsequent address requests until the address request is deasserted. This prevents the extra address bus requests from resulting in address grants that are unused and allows other modules to use the address bus. Table 1–3 shows an example address grant cycle. Master 2 starts requesting the address bus during cycle 1. The request reaches the Bus Controller during cycle 3. The timing of an address grant is unknown because there may be higher priority requests for the address bus during the same cycle, so the master asserts it FB_AREQ signal until it decodes an address grant. Because of the pipelined nature of FusionBus, there are an additional 3 address requests cycles pending on FusionBus at the time the grant is decoded at the master. During cycles 3 and 4, the Bus Controller has higher priority address requests from modules 3 and 4. During cycle 5, the Bus Controller grants the address bus to module 2 based on request 2c. The address grant reaches module 2 during cycle 7, at which time module 2 has already placed address requests 2d, 2e, and 2f on the bus. These requests are ignored by the address controller during cycles 6, 7, and 8 due to the grant 2c at the Bus Controller during cycle 5.

TABLE 1-3

| | Address Grant | | | | | | | |
|---|---|---|---|---|---|---|---|---|
| | Bus Cycle | | | | | | | |
| Signal | 1 | 2 | 3 | 4 | 5 | 6 | 7 | 8 |
| Master 2 PHY_AREQ | 2a | 2b | 2c | 2d | 2e | 2f | | |
| Bus Controller PHY_AREQ | | | 3, 2a | 4, 2b | 2c | 2d | 2e | 2f |
| Bus Controller PHY_AGNT | | | 3 | 4 | 2c | | | |
| Master 2 PHY_AGNT | | | | | | | 2c | |

Burst Transaction Speed

During the address phase of each FusionBus transaction, the master and slave specify their desired speeds through the FB_MSPEED and FB_SSPEED signals respectively. The Bus Controller monitors these signals and selects as the speed of the transaction the larger of the master and slave values. The speed specifies the minimum number of Fusion-Bus cycles between data grants to transaction data source. The Bus Controller allows the transaction data source to continuously request the data bus by ignoring the number of data requests following a data grant dictated by the transaction speed value.

Fractional speed values are supported by varying the number of ignored data requests following a data grant from one data grant to the next. For example, Table 1–4 shows master 2 and master 3 requesting the data bus. The transaction for master 2 has a speed of 1.5 and the transaction for master 3 has a speed of 0. Master 2 has the higher priority. Master 2 is granted during cycle 3, and the data request 2b during cycle 4 is ignored so that master 3 is granted. The data requests 2d and 2e are ignored following the data grant to master 2 in cycle 5. The average number of requests that were ignored following a data grant for master 2 is then 1.5.

If a master is not granted the data bus for one or more cycles due to higher priority requests, the number of data requests ignored following the data grant is not decreased to compensate. For example, a master with speed 3 that was granted the data bus during cycles 1 and 6 still have data requests during cycles 7, 8, and 9 ignored even though a data grant during cycle 9 maintains an average of 3 cycles between grants. The speed should be viewed as controlling the maximum rate of a transaction instead of the average.

The timing of an data grants is unknown because there may be higher priority requests for the data bus, so the master asserts it FB_DREQ signal until it decodes the data grant for the final word of the transfer. This results in an additional 3 data requests issued by the master beyond the end of the burst transaction. In Table 1–4, master 3 receives tile final data grant for a burst transaction in cycle 6 based on request 3d. When master 3 receives this grant in cycle 8, it has already issued requests 3e, 3f, and 3g. The impact of these extra end of burst requests can be minimized by setting the transaction burst speed greater than 0. If the transaction burst speed is at least 3, the Bus Controller ignores the 3 extra requests and they have no effect on data bus utilization.

Burst transactions that have a length of 1 word64 or less require only a single data grant to complete. The Bus Controller sets the master speed for these transactions to 3 to insure that the extra end of burst data requests do not result in unused data cycles. Since the transaction requires only a single data grant and the speed only affects data requests following a data grant, this action by the Bus Controller does not affect the timing of the transaction.

Bus Monitoring

The Bus Controller monitors the usage of the address and data bus and stores usage information in registers that are accessible by the configuration mechanism. The two types of information collected are bus usage by host and bus average utilization. There is a separate register for each bus (address and data) and for the two types. The bus usage by host registers have a single bit for each FusionBus master. When a bus is granted to a Module ID, the corresponding bit in the usage register is set. The bits remain set until the register is read via the configuration mechanism. Reading the register provides a list of all the modules that have used the particular bus since the last time the register was read. Bus grants to the highest priority module because there were no requests do not set any bits in the usage registers The bus average measurements count the number of bus cycles used during a 1024 cycle measurement period. At the end of the period, the most significant 8 bits of the count are transferred to the bus average register where it may be read by the configuration mechanism. The register value remains constant until the end of the next measurement period at which time the register is updated with the new value. The FusionBus signal FB_ARDY is used to count address bus cycles and the FB_DRDY signal is used to count data bus cycles.

TABLE 1-4

| | Data Grant | | | | | | | |
|---|---|---|---|---|---|---|---|---|
| | Bus Cycle | | | | | | | |
| Signal | 1 | 2 | 3 | 4 | 5 | 6 | 7 | 8 |
| Master 2 PHY_DREQ | 2a | 2b | 2c | 2d | 2e | 2f | 2g | 2h |
| Master 3 PHY_DREQ | 3a | 3b | 3c | 3d | 3e | 3f | 3g | |
| Bus Controller PHY_DREQ | | | 2a, 3a | 2b, 3b | 2c, 3c | 2d, 3d | 2e, 3e | 2f, 3f |
| Bus Controller PHY_DGNT | | | 2 | 3 | 2 | 3 | 3 | 2 |

Bus Controller Implementation

Block Diagram

The block diagram of the Bus Controller is shown in FIG. 2. The actual makeup of the Bus Controller varies depending on the number of FusionBus masters supported. There is one Speed and Map sub-module present for each master, and the internal logic of the other modules are scaled by the number of masters. FIG. 2 shows a configuration for four masters for simplicity. Signals leading into the block of Speed or Map modules with a "[i]" suffix indicate a bus with the $i^{th}$ bit of the bus connecting to the $i^{th}$ module in the block.

The Physical Layer provides the synchronization layer and tristate drivers between FusionBus and the rest of the module. It also contains the usage registers that record usage of the address and data busses by each master, and the data multiplexers for configuration reads. Each speed module masks the address and data request for a single master. The address request for a master is blocked after an address grant until the request is de-asserted and then asserted. The data requests are blocked based on the current transaction speed and the number of cycles since the last data grant.

There is one Map module for each priority level in the Bus Controller (the same as the number of masters). The Map module contains the Module ID and Group values for the priority level, and select the appropriate address and data request from SPD_AREQ and SPD_DREQ busses based on the stored Module ID. The Module IDs are output to the Priority modules where the Module IDs of the highest priority requests are output as the address and data grants. The Module ID and Group values are also output to the Physical Layer for configuration reads (not shown). Both the Module ID and Group values can be loaded from the configuration data under control of the ROT_LOAD_CONFIG[i] signals for configuration writes. The ROT_LOAD[i] and ROT_INSERT[i] signals also control loading the Module ID with either the granted Module ID or the next lower priority Module ID in order to perform LRU rotations.

The Rotate module uses the set of Group values and the prioritized data requests to determine the LRU rotation of Module IDs (if any). The Rotate module also determines which priority levels should be loaded with configuration data during configuration writes.

The Select module de-multiplexes the PRI_AGNT and PRI_DGNT signals to provide individual grant signals for use in the Speed modules for request masking. It also uses the PHY_MSTRID and PHY_ARDY signals to provide individual SEL_ARDY signals to the Speed modules to load in new transaction speed values at the start of a transaction.

The Bus Average block counts PHY_ARDY and PHY_DRDY over a 1024 FusionBus cycle period to provide an address and data bus utilization measurement.

FusionBus PHY Layer
FusionBus PHY Layer Diagram

The standard FusionBus Physical Layer cannot be used because the direction of the request and grant signals to the Bus Controller is the opposite from all other modules.

Figure 3:
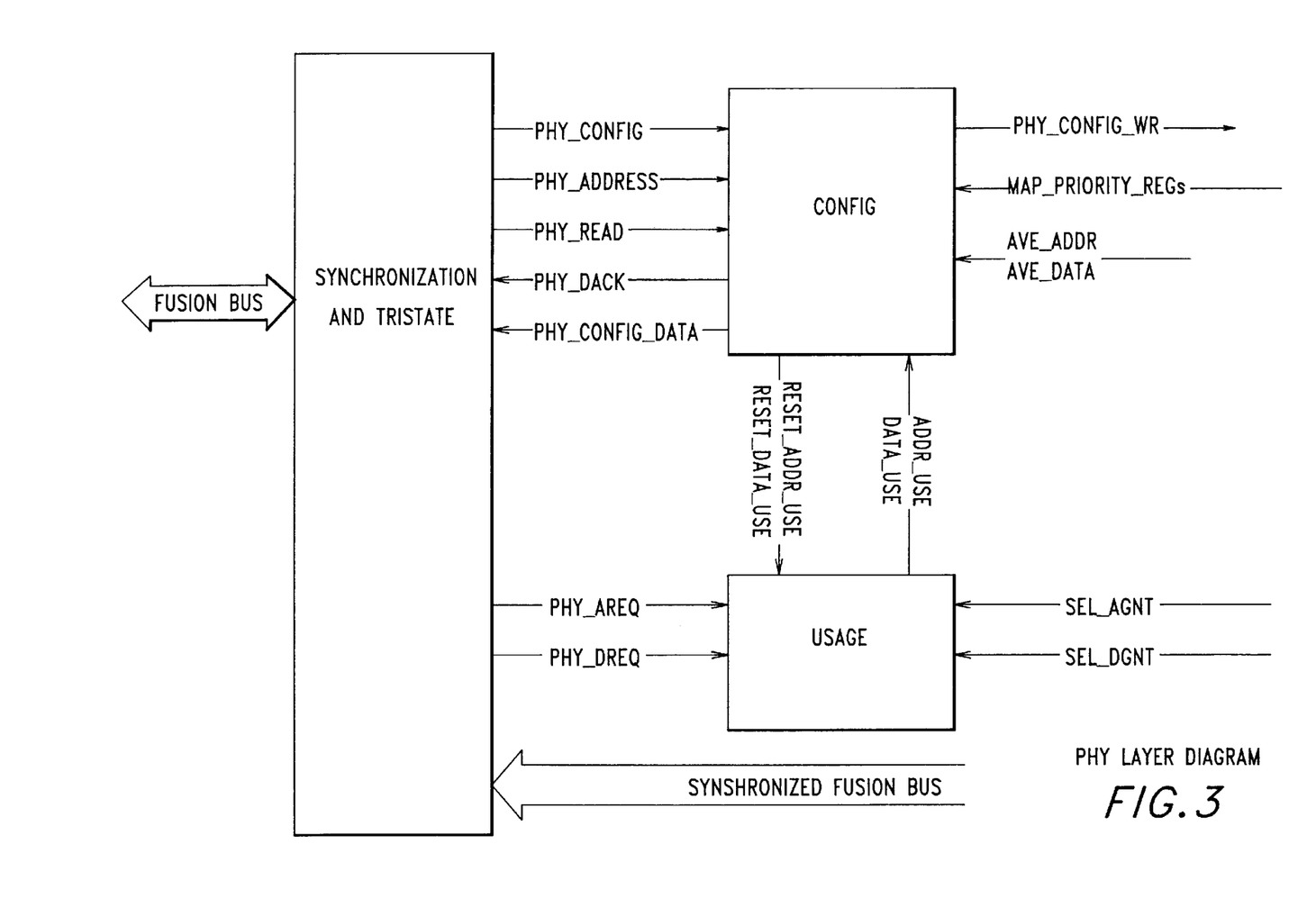
FIG. 3 is a block diagram illustrating the physical layer connections for the bus controller of FIG. 2.

The PHY Layer block diagram is shown in FIG. 3.
FusionBus PHY Functional Descriptions The PHY Layer contains a synchronization and tristate block for connection to FusionBus. The only tristate signals are the data bus and FB_DACK used for configuration reads and writes. The Config block decodes configuration reads and writes, and multiplexes the correct configuration read data onto the data bus. The Usage block contains the address and data usage registers. A bit is set in the address register when the PHY_AREQ and SEL_AGNT bits for the same master are both asserted. A bit in the data register is set when the PHY_DREQ and SEL_DGNT bits for the same master are both set. The usage registers are reset based on a configuration read of the register.

FusionBus PHY Layer Interfaces

FBC_MASTER_SIZE is the number of modules supported by the Bus Controller.

FBC_GNT_WIDTH is the number of bits required to specify the address and data grants.

TABLE 2-1

Fusion PHY Layer Interfaces

| Signal Name | Direction | Description |
|---|---|---|
| FCLK | input | master clock |
| FRST | input | master reset |
| | | Fusion Bus Physical Layer |
| FB_AREQ [FBC_MASTER_SIZE-1:0] | input | address request |
| FB_AGNT [4:0] | output | address grant |
| FB_CONFIG | input | configuration cycle |
| FB_MSTRID [4:0] | input | master ID |
| FB_ADDR [31:0] | input | address |
| FB_SSPEED [4:0] | input | slave speed |
| FB_MSPEED [4:0] | input | master speed |
| FB_COUNT [10:0] | input | transfer length in bytes |
| FB_ARDY | input | address ready (used to load FB_MSPEED) |
| FB_AACK | input | address acknowledge (used to load FB_SSPEED) |
| FB_READ | input | read/write |
| FB_CFGREQ | input | configuration address/data bus request |
| FB_DREQ [FBC_MASTER_SIZE-1:0] | input | data request |
| FB_DGNT [4:0] | output | data grant |
| FB_DRDY | input | data ready |
| FB_DACK | output | data acknowledge for configuration cycle |
| FB_DATA [63:0] | inout | data bus |
| | | Synchronized Fusion Bus |
| PHY_FRST | output | Reset |
| PHY_AREQ [FBC_MASTER_SIZE-1:0] | output | address request |
| PHY_CONFIG_WR | output | configuration write cycle |
| PHY_MSTRID [FBC_GNT_WIDTH-1:0] | output | Master ID |
| PHY_ADDR[15:0] | output | address bus for configuration writes |

TABLE 2-1-continued

Fusion PHY Layer Interfaces

| Signal Name | Direction | Description |
|---|---|---|
| PHY_SSPEED [4:0] | output | slave speed |
| PHY_MSPEED [4:0] | output | master speed |
| PHY_LEN_ONE | output | transfer length is 1 word64 |
| PHY_ARDY | output | address ready |
| PHY_AACK | output | address acknowledge |
| PHY_CFGREQ | output | configuration address/data bus request |
| PHY_DREQ [FBC_MASTER_SIZE-1:0] | output | data request |
| PHY_DRDY | output | data ready |
| PHY_DATA [31:0] | output | data bus for configuration writes |
| | | Fusion Bus Outputs |
| PRI_AGNT [FBC_GNT_WIDTH-1:0] | input | address grant |
| PRI_DGNT [FBC_GNT_WIDTH-1:0] | input | data grant |
| | | Usage data |
| SEL_AGNT [FBC_MASTER_SIZE-1:0] | input | individual AGNT lines |
| SEL_DGNT [FBC_MASTER_SIZE-1:0] | input | individual DGNT lines |
| | | Configuration Read data |
| AVE_ADDR [7:0] | input | average address bus usage |
| AVE_DATA [7:0] | input | average data bus usage |
| MAP_PRIORITY_REG0 [7:0] | input | priority register (Group and Module ID) |
| ... | | |
| MAP_PRIORITY_REG <FBC_MASTER_SIZE-2> [7:0] | input | priority register |

Speed

Speed Diagram

Figure 4:
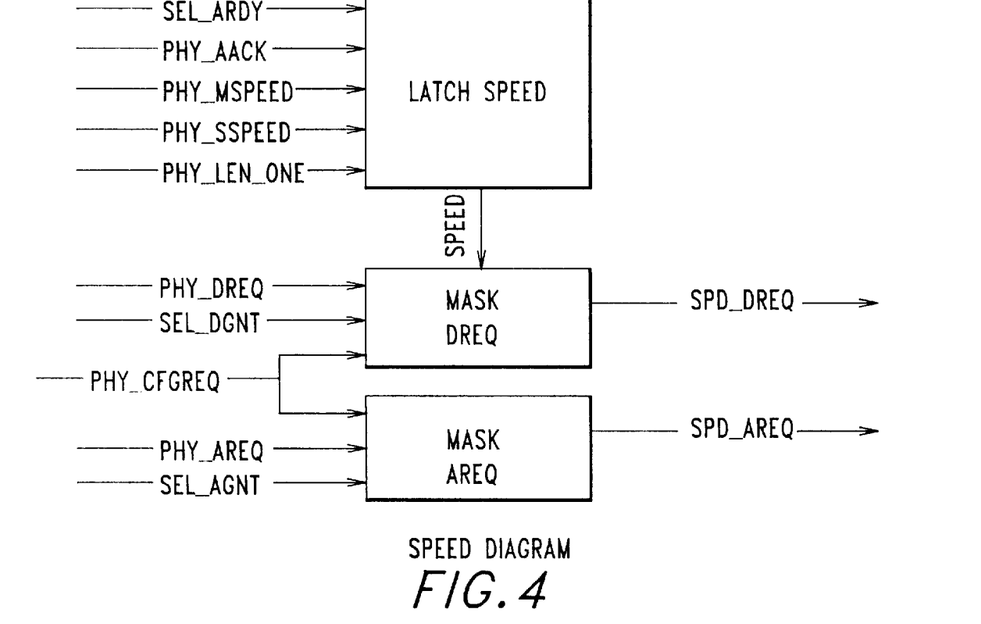
FIG. 4 is a block diagram illustrating a speed module for use in masking incoming address and data requests.

The speed module shown in FIG. 4 is used to mask the incoming address and data requests.

Speed Functional Descriptions

The Latch Speed and Mask DREQ blocks share a count register. When SEL_ARDY is asserted, PHY_MSPEED is latched into an internal speed register. This value is forced to a speed of 3 when the PHY_LEN_ONE signal is asserted along with SEL_ARDY, indicating a single word transaction. The count register is used to wait for two cycles to for the PHY_SSPEED speed value to become valid. If PHY_AACK then indicates PRY_SSPEED is valid and PHY_SSPEED is greater that the previously loaded value from the master, the internal speed value is loaded with PHY_SSPEED.

The internal speed value is then used to regulate the number of data requests passed through the Mask DREQ block to priority arbiters. The count field is used to count the number of cycles since the last data grant as indicated by SEL_DGNT. All data requests are blocked while the count field is greater than 0. When count reaches value indicated by the speed value, count is reset to 0 and data requests are passed through until another data grant occurs. The number of cycles to count after a data grant is the integer portion of the speed value plus one additional cycle depending on the fractional portion of the speed value and the number of data grants since the beginning of the transaction. For example, if the fractional speed value is 0.5, an extra count cycle is added after every other data grant.

The Mask AREQ block passes PHY_AREQ signal through to SPD_AREQ until an address grant occurs as indicated by SEL_AGNT. SPD_AREQ is then held low until PHY_AREQ is deasserted.

PHY_CFGREQ forces both SPD_DREQ and SPD_AREQ low.

Speed Interfaces

TABLE 2-2

Speed Interfaces

| Signal Name | Direction | Description |
|---|---|---|
| FCLK | input | master clock |
| PHY_FRST | input | master reset |
| | | Outputs |
| SPD_AREQ | output | masked address request |
| SPD_DREQ | output | masked data request |
| | | Physical Layer |
| PHY_AREQ | input | raw address request |
| PHY_DREQ | input | raw data request |
| PHY_SSPEED [4:0] | input | slave speed value |
| PHY_MSPEED [4:0] | input | master speed value |
| PHY_LEN_ONE | input | transfer is single word64 |
| PHY_AACK | input | indicates SSPEED valid |
| PHY_CFGREQ | input | configuration address/data request |
| | | Select |
| SEL_AGNT | input | new AGNT for master |
| SEL_DGNT | input | new DGNT for master |
| SEL_ARDY | input | new address cycle |

Map Functional Descriptions

Figure 5:
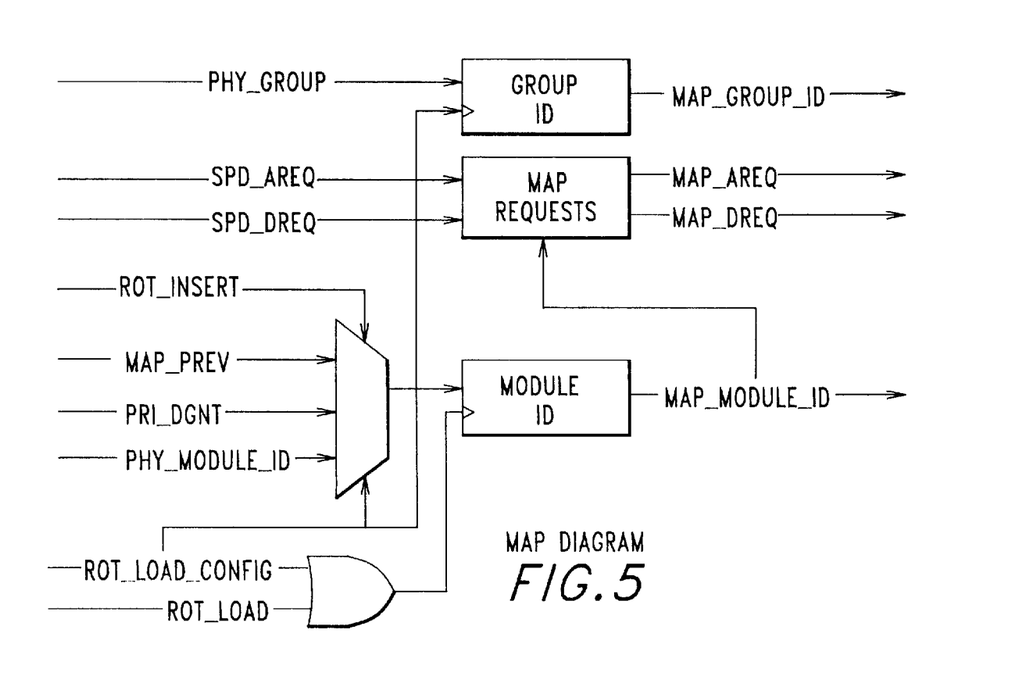
FIG. 5 is block diagram illustrating a map module for storing the priority level and group assigned to each request and mapping the unprioritized requests into prioritized requests.

Referring to FIG. 5, the map module stores the Group and Module ID for a particular priority level. The Group and Module ID are loaded from the Physical Layer data on a ROT_LOAD_CONFIG signal. The Module ID may also be loaded on the ROT_LOAD signal to perform LRU rotations. The ROT_INSERT signal selects the source of the new Module ID for LRU rotations. When the priority level is the lowest priority level in an LRU group, ROT_INSERT is asserted to load the Module ID from the current data grant (PRI_DGNT). Otherwise, the Module ID is loaded from the MAP_PREV value which is connected to the Module ID for the next lower priority level.

The current Module ID is used to select the corresponding address and data request for output as MAP_AREQ and MAP_DREQ, respectively. The MAP_AREQ and MAP_DREQ outputs from all the Map modules are collected together in priority order for the priority arbiter.

Map Interfaces number is greater than 0 (an LRU group), the Group Mask block constructs a mask GRP_SEL with bits set for each module that are members of the same group. If the selected group number is 0, GRP_SEL becomes all zeros.

TABLE 2-3

Map Interfaces

| Signal Name | Direction | Description |
|---|---|---|
| FCLK | input | Master Clock |
| PHY_FRST | input | Master Reset |
| Outputs | | |
| MAP_AREQ | output | selected address request |
| MAP_DREQ | output | selected data request |
| MAP_MODULE_ID [FBC_GNT_WIDTH-1:0] | output | Module ID register |
| MAP_GROUP_ID [1:0] | output | group register |
| Speed | | |
| SPD_AREQ [FBC_MASTER_SIZE-1:0] | input | address request from all modules |
| SPD_DREQ [FBC_MASTER_SIZE-1:0] | input | data request from all modules |
| PHY | | |
| PHY_GROUP [1:0] | input | new group ID for configuration |
| PHY_MODULE_ID [FBC_GNT_WIDTH-1:0] | input | new Module ID for configuration write |
| Rotate | | |
| ROT_LOAD | input | load Module ID with new LRU value |
| ROT_INSERT | input | insert granted Module ID |
| ROT_LOAD_CONFIG | input | load module and group ID with configuration value |
| Previous Map | | |
| MAP_PREV [FBC_GNT_WIDTH-1:0] | input | lower priority Module ID (shift up) |
| Priority | | |
| PRI_DGNT [FBC_GNT_WIDTH-1:0] | input | granted Module ID |

Priority
Priority Functional Descriptions

The Priority module takes a set of requests in priority order and the corresponding Module IDs and returns the Module ID of the highest priority request. If there are no requests, either because there are no modules requesting the bus or because PHY_CFGREQ is asserted, Module ID 0 (normally the Fusion Host Interface) is granted. A separate Priority module instantiation is used for address and data grants to perform both every cycle.

Priority Interfaces

The Thermometer block generates a mask with a bit set corresponding to the highest priority request, and bits for all lower priority levels also set. The THERMOMETER mask is combined with the GRP_SEL mask to generate the ROT_LOAD mask. The ROT_LOAD mask has a bit set for each priority level that receives a new Module ID due to the LRU rotation. The GRP_SEL is also used to form the ROT_INSERT group by forming the XOR of GRP_SEL with a shifted copy of GRP_SEL. ROT_INSERT is a mask of the priority level at the lowest priority level in the LRU group that receives the Module ID of the highest priority requester. This is the Module ID that is granted the bus and

TABLE 2-4

Priority Interfaces

| Signal Name | Direction | Description |
|---|---|---|
| PRI_GNT [FBC_GNT_WIDTH-1:0] | output | Module ID for grant |
| Map | | |
| MAP_REQ [FBC_MASTER_SIZE-2:0] | input | requests by priority level |
| MAP_MODULE_ID0 [FBC_GNT_WIDTH-1:0] | input | Module ID for priority level 0 |
| MAP_MODULE_ID1 [FBC_GNT_WIDTH-1:0] | input | Module ID for priority level 1 |
| . . . | | |
| MAP_MODULE_ID<FBC_MASTER_SIZE-2> [FBC_GNT_WIDTH-1:0] | input | Module ID for lowest priority level |

Rotate Functional Descriptions

Figure 6:
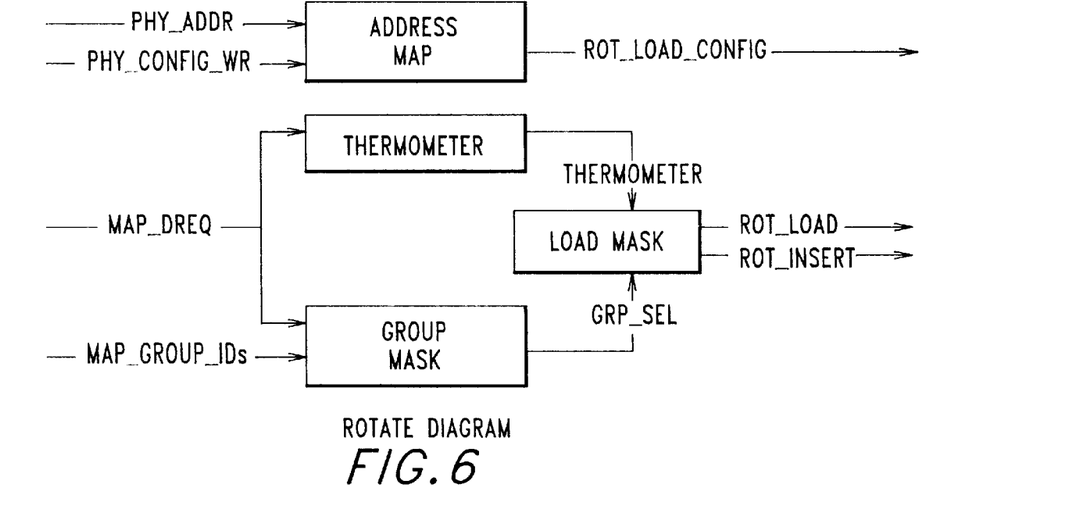
FIG. 6 is a block diagram illustrating a rotate module for generating new relative priority levels.
Figure 7:
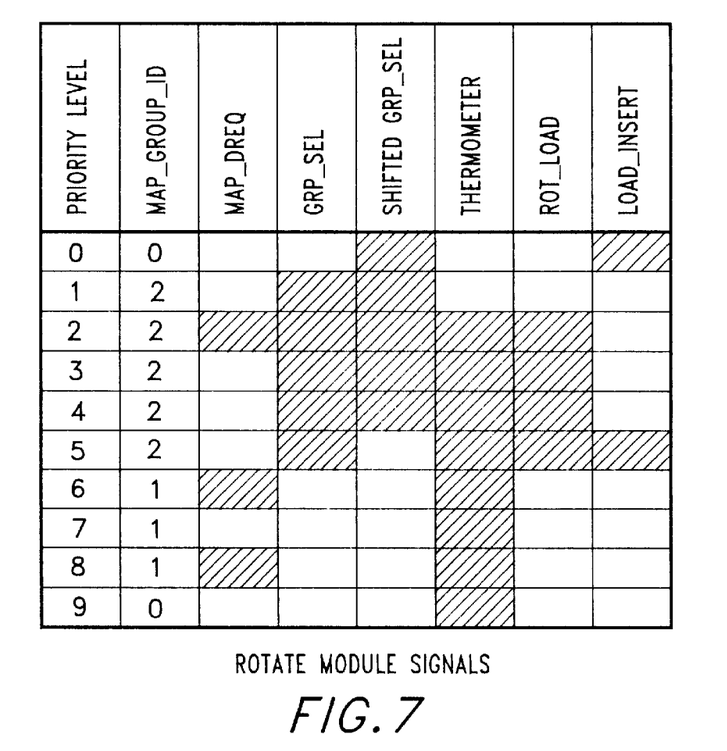
FIG. 7 is an illustration in chart form of rotate module signals in accordance with the present invention.

Referring to FIG. 6, the Address Map block decodes configuration writes and provides load signals to the Module ID and group registers on the ROT_LOAD_CONFIG signals. The Thermometer, Group Mask, and Load Mask blocks generate the load masks for LRU rotations. The Group Mask block first determines the LRU group number of the highest priority request on MAP_DREQ. If the group subsequently rotated to the bottom of the LRU group. The ROT_INSERT has a spurious bit set at the priority level just above the LRU group, but this bit has no effect since it is not included in the ROT_LOAD mask. FIG. 7 shows an example of the Rotate module signals for a case where priority level 2 is the highest priority requester. Dark blocks correspond to bits set to 1 and light blocks correspond to bits set to 0.

TABLE 2-5

Rotate Interfaces

| Signal Name | Direction | Description |
|---|---|---|
| PHY | | |
| PHY_ADDR [7:2] | input | Configuration register address |
| PHY_CONFIG_WR | input | configuration write cycle |
| Load Masks | | |
| ROT_LOAD [FBC_MASTER_SIZE-2:0] | output | mask to load new LRU Module ID |
| ROT_LOAD_CONFIG [FBC_MASTER_SIZE-2:0] | output | mask to load new configuration module and group ID |
| ROT_INSERT [FBC_MASTER_SIZE-2:0] | output | mask to load granted Module ID instead of previous ID for LRU rotation |
| Map | | |
| MAP_DREQ [FBC_GNT_WIDTH-1:0] | input | data requests by priority level |
| MAP_GROUP_ID0 [1:0] | input | Group for priority level 0 |
| MAP_GROUP_ID1 [1:0] | input | Group for priority level 1 |
| ... | | |
| MAP_GROUP_ID<FBC_MASTER_SIZE-1> [1:0] | input | Group for lowest priority level |

Select

Select Functional Descriptions

The Select module de-multiplexes the address and data grant busses to provide individual grant signals to each of the Speed modules. The select module also de-multiplexes the MSTRID bus when ARDY is asserted to provide individual ARDY signals to each of the Speed modules for loading new speed values.

Select Interfaces

TABLE 2-6

Select Interfaces

| Signal Name | Direction | Description |
|---|---|---|
| SEL_AGNT [FBC_MASTER_SIZE-1:0] | output | address grant by module |
| SEL_DGNT [FBC_MASTER_SIZE-1:0] | output | data grant by module |
| SEL_ARDY [FBC_MASTER_SIZE-1:0] | output | address ready by module |
| Priority | | |
| PRI_AGNT [FBC_GNT_WIDTH-1:0] | input | Module ID of address grant |
| PRI_DGNT [FBC_GNT_WIDTH-1:0] | input | Module ID of data grant |
| PHY | | |
| PHY_ARDY | input | address ready |
| PHY_MSTRID [FBC_GNT_WIDTH-1:0] | input | Module ID of ARDY |

Bus Average

Bus Average Functional Descriptions

The Bus Average block maintains a free running count to determine the boundaries of 1024 cycle measurement periods. It also contains a pair of 10 bit accumulators for counting the number of FB_ARDY and FB_DRDY cycles during the measurement period. At the end of the measurement period, the 8 MSBs of the accumulators are transferred to the externally visible registers AVE_ADDR and AVE_DATA and the accumulators are reset.

Bus Average Interfaces

TABLE 2-7

Bus Average Interfaces

| Signal Name | Direction | Description |
|---|---|---|
| FCLK | input | Master clock |
| PHY_FRST | input | Master reset |
| PHY_ARDY | input | address bus use |
| PHY_DRDY | input | data bus use |
| AVE_ADDR [7:0] | output | address average |
| AVE_DATA [7:0] | output | data average |

One skilled in the art may devise many alternative configurations for the method and associated bus controller disclosed herein. Therefore, it should be understood that the present invention may be embodied in many other specific forms without departing from the spirit or scope of the invention and that the present examples and method are to be considered as illustrative and not restrictive, and the invention is not to be limited to the details given herein, but may be modified within the scope of the appended claims.

What is claimed is:

1. In a digital system including a bus arrangement having at least one bus which interconnects at least three modules in a predetermined way, each of said modules being capable of requesting the use of said bus and each module being granted its request based on an established scheme of priorities, a method of managing the priority of each of said modules for the use of said bus, said method comprising the steps of:

a) establishing a set of priorities for use as said scheme of priorities such that the number of priorities is equal to the number of modules in the system, designating at least a first group of said priorities as a shared priority allocation group, and designating at least a second group of priorities as a fixed priority allocation group;

b) assigning one module to each priority; and c) upon granting the use of the bus to a requesting module within the shared priority group based, at least in part, upon said priorities, reassigning the modules initially assigned to the shared priority allocation group to different priorities within the shared priority allocation group and upon granting the use of the bus to a requesting module within the fixed priority allocation group, maintaining the priority assignments of modules initially assigned to the fixed priority allocation group.

2. The method of claim 1 wherein said step of granting the use of the bus to a module within the shared priority group includes the step of granting the bus to the requesting module having the highest priority within the shared priority allocation group.

3. The method of claim 1 wherein the shared priority allocation group includes successively ranked priorities which range from a lowest group priority to a highest group priority and wherein said reassigning step, as performed for the shared priority group, includes the step of reassigning the module which is granted the use of said bus to said lowest group priority such that equal access is provided to the bus with respect to the modules of the shared priority allocation group.

4. The method of claim 1 wherein said method further comprises the step of maintaining the priority assignments of modules initially assigned to the shared priority allocation group when one of the modules within the fixed allocation group is granted the use of the bus.

5. The method of claim 1 wherein said step of granting the use of said bus to the requesting module within the shared priority allocation group identifies each grant as either an address grant providing for transmission of address information on said bus or a data transaction grant providing for transmission of data transaction information on said bus, said method further comprising the step of reassigning the modules initially assigned to the shared priority allocation group to different priorities within the shared priority allocation group after one of the modules within the shared priority allocation group is granted the use of said bus only for the purpose of said data transaction.

6. The method of claim 3 wherein all modules within said shared priority allocation group having a priority below that of the module which is granted the bus are reassigned to the next highest priority within the shared priority allocation group in conjunction with the step of reassigning the module which is granted the use of said bus to said lowest group priority.

7. In a digital system including a bus arrangement having at least one bus which interconnects at least three modules in a predetermined way, each of said modules being capable of requesting the use of said bus such that the requesting modules are in contention and each module being granted its request based on an established scheme of priorities, a method of managing the priority of each of said modules for the use of said bus, said method comprising the steps of:
    a) initially establishing at least two priority groups for use in granting module requests to designate at least one priority group as a shared priority allocation group and to designate at least one other priority group as a fixed priority group such that each priority group includes a relative priority in relation to the other group or groups and each priority group includes a predetermined number of priority levels such that the total number of priority levels among all of the priority groups is equal to the total number of modules;
    b) assigning said modules to priorities such that one module is assigned to each priority level;
    c) when two or more modules within different priority groups simultaneously request the use of said bus, arbitrating among the requesting modules based, at least in part, on the relative priority levels of the priority groups to which the requesting modules belong so as to determine a winning priority group;
    d) granting the use of the bus to the requesting module within said winning priority group; and
    e) reassigning the modules initially assigned to the shared priority allocation group to different priority levels within the shared priority allocation group when one of the modules within the shared priority allocation group is granted the use of said bus.

8. The method of claim 7 wherein the shared priority allocation group includes successively ranked priorities which range from a lowest group priority to a highest group priority and wherein said reassigning step includes the step of reassigning the module which is granted the use of said bus to said lowest group priority such that equal access is provided to the bus with respect to the modules of the shared priority allocation group.

9. The method of claim 7 further comprising the step of maintaining the priority level assignments of modules initially assigned to the fixed allocation group when one of the modules within the fixed allocation group is granted the use of the bus.

10. The method of claim 7 further comprising the steps of:
    e) at some point during the operation of said system, reassigning at least one of said modules to a different priority group; and
    f) thereafter, granting the use of said bus based, at least in part, on the reassignment of said at least one module.

11. The method of claim 7 wherein at least one of said priority groups comprises an LRU priority allocation group to which at least two modules are assigned.

12. The method of claim 8 wherein all modules within said shared priority allocation group having a priority below that of the module which is granted the use of the bus are reassigned to the next highest priority within the shared priority allocation group in conjunction with the step of reassigning the module which is granted the use of said bus to said lowest group priority.

13. In a digital system including a bus arrangement having at least one bus which interconnects at least three modules in a predetermined way, each of said modules being capable of requesting the use of said bus such that the requesting modules are in contention and each module being granted its request based on an established scheme of priorities, a method of managing the priority of each of said modules for the use of said bus, said method comprising the steps of:
    a) initially establishing at least two priority groups for use in granting module requests to designate at least one priority group as a shared priority allocation group and to designate at least one other priority group as a fixed priority group such that each priority group includes a relative priority in relation to the other group or groups and each priority group includes a predetermined number of priority levels such that the total number of priority levels among all of the priority groups is equal to the total number of modules;
    b) assigning said modules to priorities such that one module is assigned to each priority level;
    c) when two or more modules within different priority groups simultaneously request the use of said bus, arbitrating among the requesting modules based, at least in part, on the relative priority levels of the priority groups to which the requesting modules belong so as to determine a winning priority group;
    d) granting the use of the bus to the requesting module within said winning priority group in a way which identifies each grant as either an address grant providing for transmission of address information on said bus, or a data grant providing for transmission of transaction data; and
    e) reassigning the modules initially assigned to the shared priority allocation group to different priority levels within the shared priority allocation group after one of the modules within the shared priority allocation group is granted the use of said bus only for the purpose of a data transaction.

* * * * *